United States Patent [19]

Shimada

[11] Patent Number: 4,731,568
[45] Date of Patent: Mar. 15, 1988

[54] ERROR SIGNAL GENERATOR
[75] Inventor: Jiroh Shimada, Tokyo, Japan
[73] Assignee: NEC Corporation, Tokyo, Japan
[21] Appl. No.: 911,682
[22] Filed: Sep. 25, 1986
[30] Foreign Application Priority Data Sep. 25, 1985 [JP] Japan .................. 60-212829

[51] Int. Cl.$^4$ ............................................ G05B 19/29
[52] U.S. Cl. .................... 318/603; 318/616
[58] Field of Search .................. 318/603, 616

[56] References Cited
U.S. PATENT DOCUMENTS 4,385,821  5/1983  Kachelries ................ 318/616 X Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

An error signal generator for generating a plurality of error signals for various control values, comprises a time controller for sequentially and periodically generating a plurality of status signals, the number of which corresponds to the number of the control values. A read-out signal generator receives reference signals and/or detection signals for generating a read-out signal in response to one of the reference signals selected by the associated status signal. There is provided a preset memory storing a plurality of preset digital values for the control values and responsive to the read-out signal so as to output to a bus the preset digital value designated by the associated status signal. A count memory responds to each status signal so as to read out the data to the bus from one of the memory areas designated by the associated status signal and then is rewritten with the data on the bus into the same memory area. An adder operates to periodically subtract a value of "1" from the data on the bus and to return the result of the subtraction to the bus. An error memory responds to each of the detection signals so as to write the data on the bus into one of the memory areas designated by the associated status signal. The respective memory areas provide the data stored therein as the error signals.

4 Claims, 5 Drawing Figures

PHASE ERROR DETECTION

FREQUENCY ERROR DETECTION

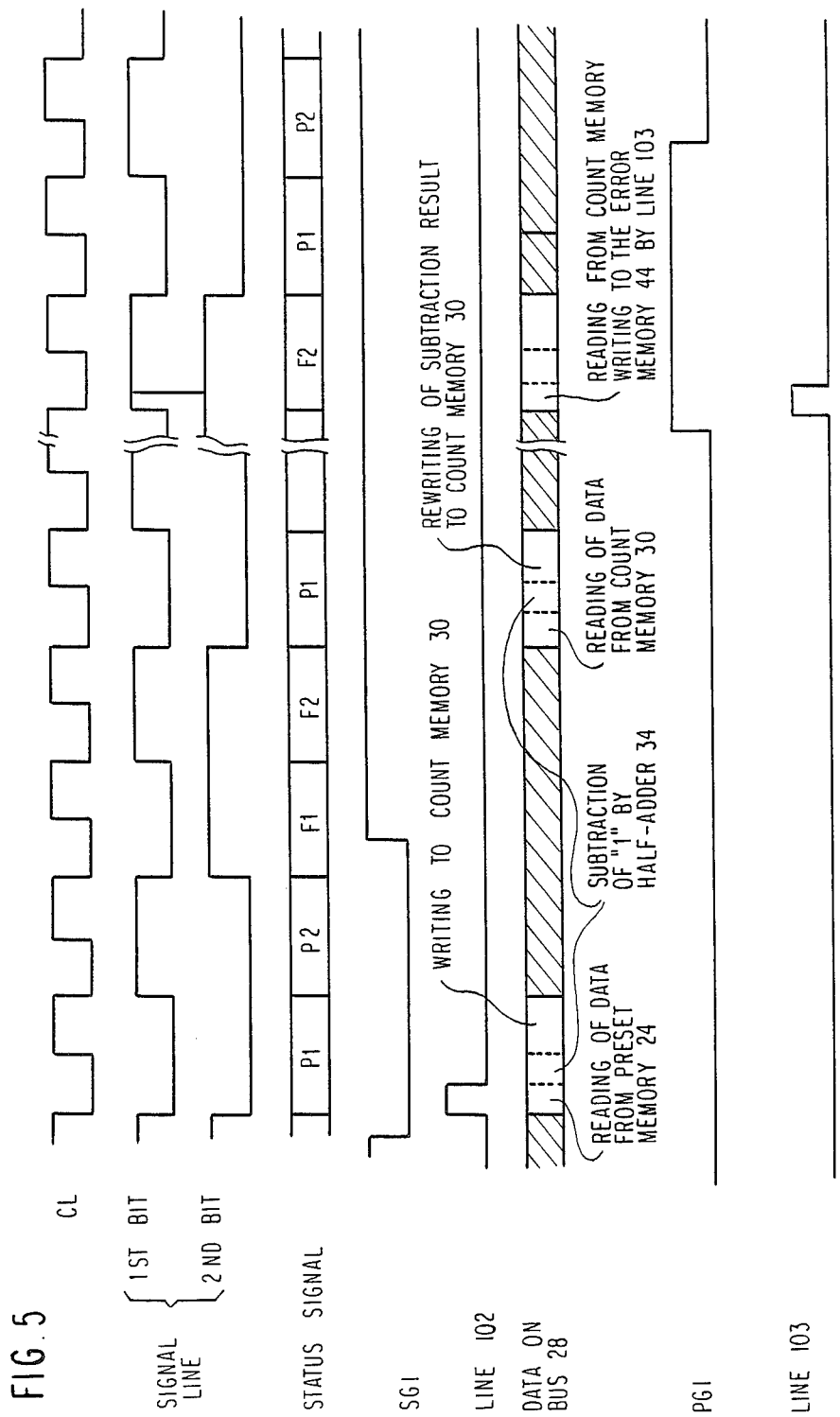

ERROR SIGNAL GENERATOR

BACKGROUND OF THE INVENTION

1. Field of the Invention

The present invention relates to an error signal generator, and more specifically to an error signal generator for producing on the basis of digital data processing a plurality of error signals which can be used to control frequencies and/or phases of various periodical operations.

2. Description of the Related Art

Conventionally, various types of devices have been used for generating an error signal which is used to control a control value to a target or desired value. Recently, such error signal generating devices tend to be digitized and assembled in the form of an integrated circuit for increased performance and no adjustment.

At present, on the other hand, such error signal generating devices are widely used in video tape recorders for control of the phase and the revolution speed of associated motors. In general, the video tape recorder comprises a so-called cylinder motor for driving a rotary head and a so-called capstan motor for tape transport. The phase and revolution speed of these motors have to be controlled at various values determined in accordance with selected operation modes of the video tape recorder. For example, the phase of the capstan motor is controlled on the basis of the ½ frequency-divided pulse of the vertical synchronizing pulse at the time of reproduction, and in the recording condition on the basis of the vertical synchronizing pulse obtained by frequency division of the color subcarrier.

In brief, to detect the phase and the revolution speed, ordinarily, each motor is associated with a pulse generator adapted to generate one pulse per revolution for detection of revolution speed and another pulse generator adapted to generate a pulse when the motor assumes a predetermined phase. The period of the speed detection pulse thus obtained is compared in a digital manner with a target period determined by the selected operation mode so as to produce a speed error signal. The phase detection pulse is compared with a phase reference pulse, and the phase difference is also compared in a digital manner with a target phase difference given in accordance with the selected operation mode.

As mentioned above, the video tape recorder is required to produce the phase error signal and the speed error signal for each of the cylinder motor and the capstan motor. Therefore, the video tape recorder has to provide four error signal generation functions. In conventional recorders, the four error signal generation functions have been performed by four discrete digital units in a parallel processing manner.

However, the provision of the four error signal generation units will make the overall circuit large, which means that a large chip area is required when it is assembled in a large scaled integrated circuit. This problem is significant in a handy type video tape recorder.

SUMMARY OF THE INVENTION

Accordingly, it is an object of the present invention to provide an error signal generator which has overcome the aforementioned drawbacks of the conventional devices.

Another object of the present invention is to provide an error signal generator which needs only a relatively small circuit scale, and which can be assembled in a relatively small chip area in the case of being implemented in an integrated circuit.

A further object of the present invention is to provide an error signal generator which can generate at least four error signals and which can be effectively incorporated in a handy type video tape recorder.

The above and other objects of the present invention are achieved in accordance with the present invention by an error signal generator for generating a plurality of error signals, each corresponding to one control value, comprising:

a time controller for sequentially and periodically generating status signals of a number corresponding to that of the control values, the status signals being distinguishable from each other;

means receiving the status signals and the corresponding number of trigger signals for the control values, the means generating a read-out signal in response to the trigger signal selected by the status signal;

means storing the corresponding number of preset digital values for the control values and responsive to the read-out signal so as to output to a bus the preset digital value designated by the status signals;

a count memory having the corresponding number of memory areas and responsive to the status signal so as to read out the data to the bus from the memory area designated by the status signal and then to write the data on the bus into the memory area designated by the status signal;

means periodically subtracting a predetermined value from the data on the bus and returning the result of the subtraction to the bus so that the result of the subtraction is written in the count memory; and an error memory having the corresponding number of memory areas and responsive to the corresponding number of detection signals for control values so as to write the data on the bus into the memory area designated by the status signal, the respective memory area providing the data stored therein as the error signals.

With the arrangement mentioned above, various circuit elements are provided in common to all the control values, and necessary memory means are combined as one unit at respective processing stages. Therefore, the number of required circuit elements such as subtraction means is greatly decreased, and the input/output interfaces for the data storage means such as the preset value storing means, the count memory and the error memory can be simplified. Therefore, the number of the circuit elements required for such interfaces can be also greatly decreased. Thus, the error signal generator can be assembled in a large scaled integrated circuit with a relatively small required chip area.

In an embodiment of the error signal generator, a gate circuit is provided between the bus and the error memory so as to allow passage of the data on the bus to the error memory only when the data on the bus fulfills a given condition.

Further, a count detector is coupled to the bus and is set with at least first and second given threshold values. This count detector operates to put the gate circuit in an open condition when the data on the bus is not greater than the first threshold values but not less than the second threshold value. The count detector can also be set with a third threshold value smaller than the second threshold value. In this case, the count detector is operative to produce a supplementary trigger signal to the read-out signal generating means when the data on the bus becomes less than the third threshold value, so that the read-out signal generating means will generate the read-out signal in response to the supplementary trigger signal even at no occurrence of the trigger signal. In addition, the count detector can be adapted to stop the operation of the subtraction means when the data on the bus is less than the second threshold value.

Further, according to the present invention there is provided a signal generating system comprising:

a first error signal generator including means for reading out a first preset data in response to a reference signal which is supplied at a reference period, means gradually changing the first preset data by each predetermined value until the next reference signal is supplied, and means in response to a first detection signal so as to produce a first error signal on the basis of the result of change of the first preset data when the first detection signal has been applied;

a second error signal generator including means for reading out a second preset data in response to a second detection signal which is supplied periodically, means gradually changing the second preset data by each predetermined value until the next second detection signal is supplied, and means for producing a second error signal on the basis of the result of change of the second preset data after a predetermined time has elapsed from application of each second detection signal; and means for controlling the operation of the first and second error signal generators in a time division manner.

The above and other objects, features and advantages of the present invention will be apparent from the following description of the preferred embodiment of the invention with reference to the accompanying drawings.

BRIEF DESCRIPTION OF THE DRAWINGS

FIG. 5 is a timing diagram of the various signals generated in the circuitry of FIG. 2.

DESCRIPTION OF THE PREFERRED EMBODIMENT

Figure 1:
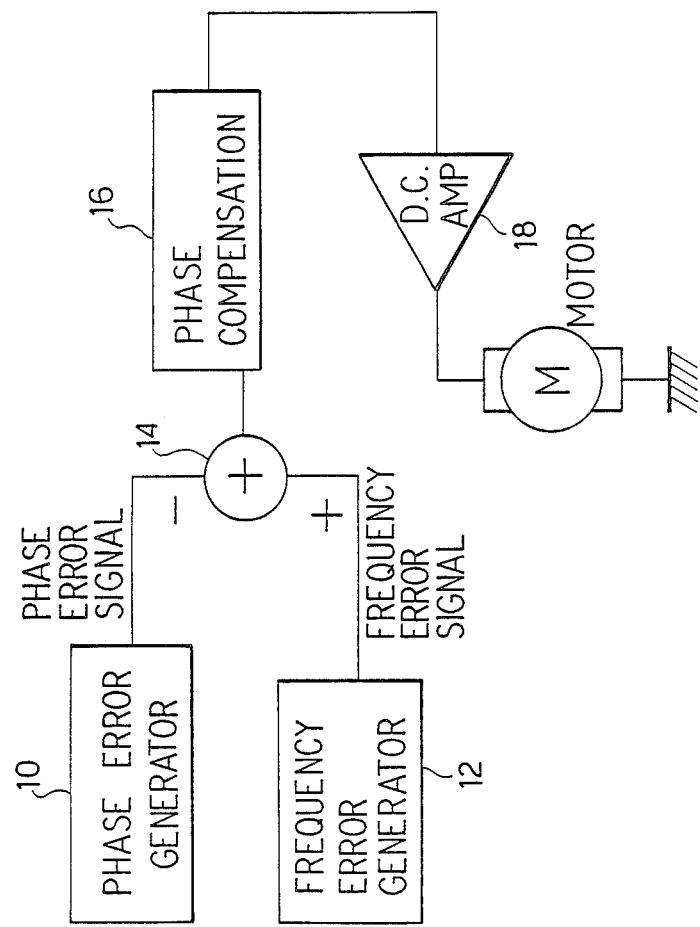
FIG. 1 is a block diagram of a typical example of a motor servo control system which can be applied with the error signal generator in accordance with the present invention.

Referring to FIG. 1, there is shown a basic circuit of a D.C. motor controller which can be used to control a cylinder motor and/or a capstan motor in video tape recorder. The shown controller includes a phase error generator 10 which produces a phase error signal on the basis of, for example, a phase detection pulse generated by a pulse generator (not shown) every time a D.C. motor M to be controlled assumes a predetermined phase. The controller also includes a frequency error generator 12 which produces a frequency error signal on the basis of a frequency detection signal such as a frequency detection pulse generated by a pulse generator (not shown) at each revolution of the motor M. Therefore, the frequency error generator 12 acts as a speed error generator. The phase and frequency error signals are applied to an adder 14 where a difference is derived and outputted to a phase compensator 16. The output of this phase compensator 16 is amplified by a D.C. amplifier 18 and then supplied to the motor M.

Figure 2:
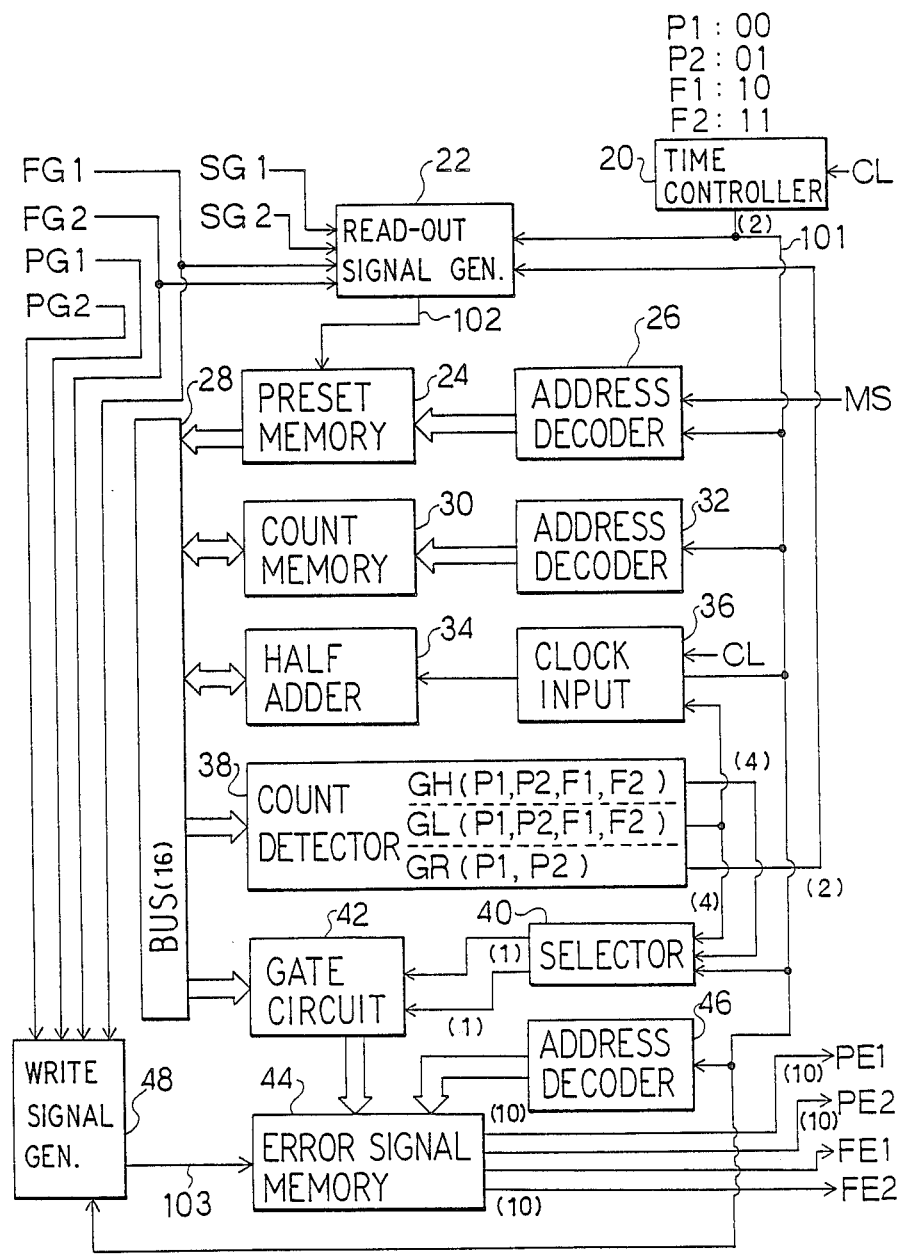
FIG. 2 is a block diagram of one embodiment of the error signal generator in accordance with the present invention.

Turning to FIG. 2 and to the timing diagram of FIG. 5, there is shown a block diagram of the error signal generator in accordance with the present invention, which can be used in place of the phase error generator 10 and the frequency error generator 12 shown in FIG. 1. Specifically, the shown generator is adapted to be capable of generating a pair of phase error signals and a pair frequency error signals for controlling a cylinder motor (not shown) and a capstan motor (not shown) in a video tape recorder. Therefore, the shown generator receives first and second frequency detection pulses FG1 and FG2 respectively generated for example at each revolution of the cylinder motor and the capstan motor, and first and second phase detection pulses PG1 and PG2 respectively generated for example at the moment the cylinder motor and the capstan motor assume the respective predetermined phase positions. The shown generator also receives a pair of phase reference pulses SG1 and SG2 for the cylinder motor and the capstan motor, respectively.

As mentioned hereinbefore, the desired phases for the motors are different in accordance with the operation modes of the video tape recorder. Therefore, a mode selection signal MS is applied to the shown generator. Furthermore, the shown generator is supplied with a clock pulse CL having a pulse repetition frequency much higher than those of the phase detection pulse and the frequency detection pulse. On the basis of the input signals mentioned above, the shown generator consequentially produces a pair of phase error signals PE1 and PE2 and a pair of frequency error signals FE1 and FE2. Incidentally, in FIG. 2, various parenthesized numerical values represent the bit numbers of respective buses.

The clock pulse CL is inputted to a time controller 20 which in turn generates a plurality of status signals on a signal line 101. These signals on line 101 are constituted of two bits and therefore assume four combinations of logic levels: "00", "01", "10" and "11" as shown in FIG. 5. Accordingly, as also designated in FIG. 5, the time controller 20 generates four status signals P1, P2, F1 and F2 which are designated respectively by the above-mentioned four logic level combinations. These status signals P1, P2, F1 and F2 are used to designate the operations for the phase error detection of the cylinder motor, the phase error detection of the capstan motor, the frequency error detection of the cylinder motor and the frequency error detection of the capstan motor, respectively. Moreover, the controller 20 sequentially generates the status signals P1, P2, F1 and F2 at a cycle that is equal to the cycle of the clock pulse CL.

The status signals P1, P2, F1 and F2 are supplied to a read-out signal generator 22 which receives the phase reference pulses SG1 and SG2 and the frequency detection signals FG1 and FG2. When one of these pulses SG1, SG2, FG1 and FG2 is applied to the generator 22, the generator 102 generates on line 102 a read-out signal 102 in synchronism with the associated one of the status signals P1, P2, F1 and F2. For example, as shown in FIG. 5, when the phase reference pulse SG1 is supplied to the generator 22, a read-out signal is generated on line 102 in synchronism with the associated status signal P1.

The read-out signal 102 is supplied to a preset value memory 24 which stores a plurality of sets of preset values, the number of which corresponds to the number of operation modes of the video tape recorder. Each set of preset values includes four preset digital values which make it possible to control the respective phases and speeds of the cylinder and capstan motors to desired values required in the corresponding operation mode. This preset value memory 24 is associated with an address decoder 26 which receives the mode selection signal MS and the status signals P1, P2, F1 and F2. Thus, when the read-out signal 102 is inputted to the preset value memory 24, one set of preset values is selected by the address decoder 26 in accordance with the mode selection signal MS, and one preset value is designated from the selected set of preset values by the address decoder 26 in accordance with the associated one of the status signals P1, P2, F1 and F2, so that the designated preset value is outputted to 16-bit bus 28. In the example of FIG. 5, it is seen that the data from the memory 24 is provided onto the bus 28 in response to the read-out signal on line 102.

To this bus 28 is also connected a count memory 30 which includes four memory areas and is associated with an address decoder 32 receiving the status signals P1, P2, F1 and F2. One of the memory areas in the count memory 30 is selected by the address decoder 32 in accordance with the associated one of the status signals P1, P2, F1 and F2. As shown in FIG. 5, the selected memory area is read out to the bus 28 in synchronism with the beginning of the associated one of the status signals P1, P2, F1 and F2, the data on the bus is then decremented by a half-adder 34 which will be described later, and the decremented data from the bus 28 is then rewritten into the selected memory location in the memory 30. Thus, the data in the each memory area is updated. As also can be seen from FIG. 5, when the signal on line 102 is present, the reading of data onto the bus 28 is performed from the memory 24 rather than the memory 30. Also, when the signal on line 103 is present, the data from the bus 28 is written into the error memory 44 during the write portion of the clock cycle, as will be explained more fully hereinafter.

The bus 28 is also interconnected to a half adder 34 controlled by an associated clock input circuit 36, which receives the clock pulse CL and the status signals P1, P2, F1 and F2. This half adder 34 operates to subtract "1" from the data on the bus 28 and then to return the result of the subtraction back to the bus 28. This data processing by the half adder 34 is completed within the first half period of one cycle of the clock pulse CL, i.e., within the first half period of each of the status signals P1, P2, F1 and F2.

Therefore, the read and write timings of the count memory 30 and the input and output timing of the half adder 34 are so adjusted that the memory 30 and the adder 34 constitute one down counter which decrements by "1" the data stored in each memory area of the memory 30 every four cycles of the clock pulses CL. Alternatively, a full adder can be used in place of the half adder 30. In this case, "0" can be inputted to one of two inputs of the full adder.

Also to the bus 28 is coupled a count detector unit 38, which comprises three count detector sections GH, GL and GR. The section GH includes four count detectors GH (P1), GH (P2), GH (P1) and GH (F2) which have inherent reference values HP1, HP2, HF1 and HF2, respectively. The section GL also includes four count detectors GL (P1), GL (P2), GL (F1) and GL (F2) which also have inherent reference values LP1, LP2, LF1 and LF2, resectively. Further, the section GR includes two count detectors GR (P1) and GR (P2) which have inherent reference values RP1 and RP2. Each count detector of the section GH generates a one-bit signal of "1" when the inherent reference value is not less than the data on the bus 28, and otherwise, each detector generates a one bit signal of "0". On the other hand, each count detector of the sections GL and GR generates a one-bit signal of "0" when the inherent reference value is not greater than the data on the bus 28, and otherwise, each detector generates a one-bit signal of "1". Therefore, the sections GH and GL output four-bit signals, respectively, to a selector 40 which also receives the time division signal 101. Further, the section GL outputs the signal to the clock input circuit 36 for the purpose explained hereinafter, and the section GR outputs a two-bit signal to the read-out signal generator 22 for the purpose also explained hereinafter.

The selector 40 operates to select one bit from the output signal of the section GH in accordance with the status signals P1, P2, F1 and F2 and also to select one bit from the section GL output signal in accordance with the status signals P1, P2, F1 and F2. The two-bit output of the selector is applied to a gate circuit 42 provided between the bus 28 and an error memory 44. The gate circuit 42 is opened to couple the bus 28 to the error signal memory 44 when each of the output bits of the selector 40 is "1".

The error signal memory 44 has four memory areas and is controlled by an associated address decoder 46 and a write signal generator 48 which both receive the status signals P1, P2, F1 and F2. The write signal generator 48 also receives the phase detection pulses PG1 and PG2 and the frequency detection pulses FG1 and FG2, and operates, when one of these detection pulses is inputted, to generate a write signal 103 to the error signal memory 44 in synchronism with a associated one of the status signals P1, P2, F1 and F2, e.g., as shown in the last two lines of FIG. 5.

In response to the write signal 103, the error signal memory 44 writes the least significant 10 bits of the data from the gate circuit 42 into a memory area designated by the address decoder 46 in accordance with the status signals P1, P2, F1 and F2. The data stored in the four memory areas are outputted as the error signals PE1, PE2, FE1 and FE2.

Figure 3:
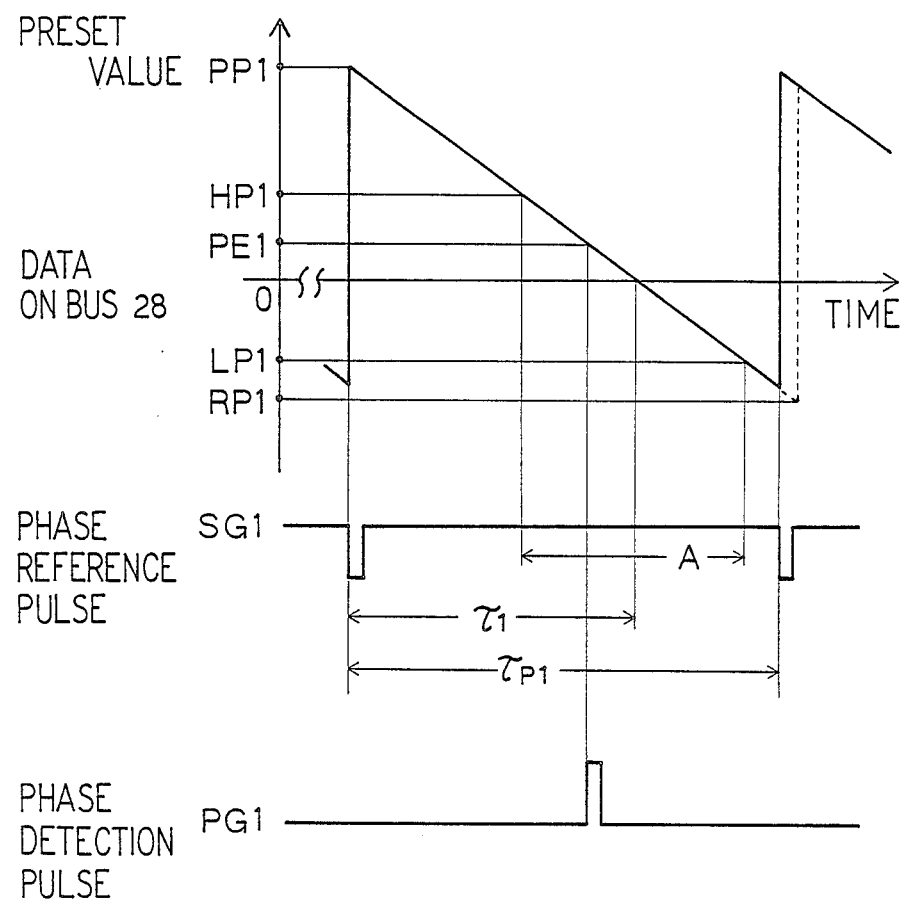
FIGS. 3 and 4 are time charts respectively illustrating the phase error signal generation operation and the frequency error signal generation operation of the generator shown in FIG. 2.

Referring to FIG. 3, there is shown a timing chart in the case of phase error detection operation of the generator shown in FIG. 2. For simplification of the drawing, the timing chart was prepared with respect only to the phase error detecting operation of the cylinder motor designated by the status signal P1.

The phase reference signal SG1 is inputted to the read-out signal generator 22, which in turn generates the read-out signal 102 in synchronism with the status signal P1 just after the falling edge of the signal SG1. The preset value memory 24 outputs to the bus 28 the preset value PP1 for the phase of the cylinder motor in accordance with the mode selection signal MS and the status signal P1. As a result, the value PP1 is written into the count memory 30. Thereafter, the data on the bus 28 is decremented by "1" at each time when the status signal P1 is generated. This value on the bus 28 is compared with the respective inherent values HP1, LP1 and RP1 by the count detectors GH (P1), GL (P1) and GR (P1). Thus, the gate circuit 42 is opened during such a period A that the data on the bus 28 is not greater than HP1 and not less than LP1 and the status signal P1 is generated. If the phase detection pulse PG1 is inputted to the write signal generator 48 during the period A, the generator 48 generates the write signal 103 in synchronism with the status signal P1 just after the rising edge of the signal PG1. In response to the write signal 103, the error signal memory 44 writes the least significant 10 bits of the data on the bus 28 in the memory area designated by the address decoder 46 in accordance with the status signal P1. The stored 10 bit-data is employed as the error signal PE1.

Now, assuming that the period of the phase reference signal SG1 is $\tau_{p1}$ and the designated phase difference for the phase P1 is $\theta_1$, the preset data PP1 is so set that the data on the bus 28 becomes "0" when the time $$\tau_1 = \tau_{p1} \frac{\theta_1}{2\pi}$$

has elapsed from the phase reference signal SG1. With such setting, the error signal PE1 stored in the memory 44 represents the deviation from the designated phase difference $\theta_1$ for the phase P1 expressed by the phase reference signal SG1, and also lead and lag of the phase is expressed by the sign of the signal PE1.

As seen from the above, if the signal PG1 is inputted outside the period A, the data on the bus is not written to the memory 44. Namely, as will be apparent from FIG. 3, an excessive error signal is prevented from being written into the memory.

The inherent value RP1 of the count detector GR (P1) is set to be slightly smaller than a minimum value of the data on the bus 28 in the case that the phase reference signal SG1 is regularly applied. The read-out signal generator 22 is adapted to generate the read-out signal 102 when the counter detector GR (P1) outputs a one-bit signal of "0" and at the same time the time division signal 101 assumes the status P1. Therefore, the count detector GR (P1) serves to compensate accidental lacking of the phase reference signal SG1.

The above explanation is directed to the phase error detection for the phase P1. But, the phase error detection for the phase P2 will be made similarly to the above operation.

Figure 4:
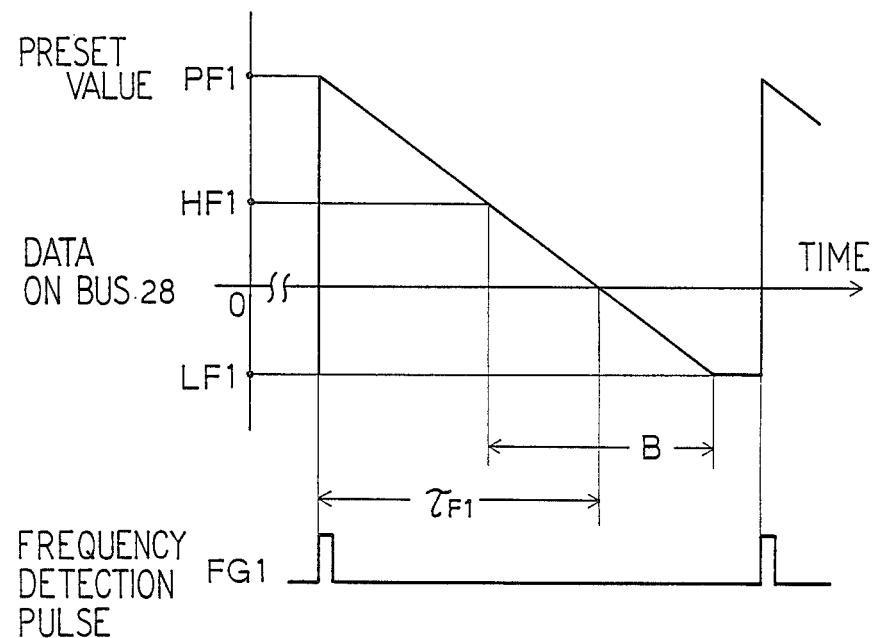

Turning to FIG. 4, there is shown a timing chart in the case of frequency error detection operation of the generator shown in FIG. 2. Similarly to FIG. 3, for simplification of drawing, the timing chart was prepared with respect only to the frequency error detecting operation of the cylinder motor designated by the third status signal F1.

The frequency detection signal FG1 is inputted to the read-out signal generator 22, which in turn generates the read-out signal 102 in synchronism with the status signal F1 just after the leading edge of the signal FG1. The preset value memory 24 outputs on the bus 28 the preset value PF1 for the speed of the cylinder motor in accordance with the mode selection signal MS and the status signal F1. As a result, the value PF1 is the data PF1 is decremented one by one every time when the status signal F1 is generated. This value on the bus 28 is compared with the respective inherent values HF1 and LF1 by the count detectors GH (F1) and GL (F1). Thus, the gate circuit 42 is opened during such a period B that the data on the bus 28 is not greater than HF1 and not less than LF1 and the status signal F1 is generated. The write signal generator 48 generates the write signal 103 at the same clock period as when the read-out signal 102 is generated by the read-out signal generator 22. Therefore, it is set such that the write signal 103 is generated during the same clock period as that of the read-out signal 102 but at a timing earlier than that of the read-out signal 102, so the least significant 10 bits of the data on the bus 28 are written into the memory 44 before the data on the bus 28 is returned to the value PF1.

Here, the preset data PF1 is so set that the data on the bus 28 written into the error signal memory 44 becomes "0" when the period of the frequency detection signal FG1 is equal to the period $\tau_{F1}$ of the desired frequency for the frequency F1. With this setting, the error signal FE1 stored in the memory 44 represents the difference between the desired frequency and the frequency F1 expressed by the frequency detection signal FG1, and the plus and minus of the difference is expressed by the sign of the signal FE1.

When the count detector GL (F1) outputs a one-bit signal of "0" and when the third status signal F1 is generated, the clock input circuit 36 inhibits passage of the clock pulse CL, so that the half adder stops the count down operation. Therefore, the count detector GL (F1) prevents the data on the bus line 28 from being decremented to the value (LF1-1) or less.

Further, if the frequency detection signal FG1 is inputted outside the period B, the data on the bus is not written to the memory 44. Namely, an excessive error signal FE1 is prevented from being written into the memory.

The above explanation is directed to the frequency error detection for the frequency F1. But, the frequency error detection for the frequency F2 will be made similarly to the above operation.

The invention has thus been shown and described with reference to the specific embodiment. However, it should be noted that the invention is in no way limited to the details of the illustrated structures but changes and modifications may be made within the scope of the appended claims.

I claim:

1. An error signal generator for generating a first error signal responsive to a first reference signal and a first detection signal and a second error signal responsive to a second reference signal and a second detection signal, comprising:

a time controller for periodically generating first and second status signals in response to a clock signal;

a preset memory storing first and second preset data and outputting to a bus line said first preset data when both of said first reference signal and said first status signal are present and said second preset data when both of said second reference signal and said second status signal are present;

a count memory having first and second memory areas and coupling to said bus line said first memory area in response to said first status signal and said second memory area in response to said second status signal;

means coupled to said bus line for subtracting a predetermined value from the data on said bus line and for returning the result of the subtraction to said bus line in response to each of said first and second status signals; and an error signal memory having third and fourth memory areas and storing at least one portion of the data on said bus line into said third memory area when both of said second detection signal and said second status signal are present, the data stored in said third and fourth memory areas being generated as said first and second error signals, respectively.

2. A generator as claimed in claim 1, wherein said first and second reference signals are derived as reference phase signals for a cylinder motor and a capstan motor of a video tape recorder, respectively, and said first and second detection signals are derived as phase detection signals of said cylinder motor and said capstan motor, respectively.

3. An error signal generator for generating first and second error signals in response to first and second detection signals, respectively, comprising:
   a time controller for periodically generating first and second status signals in response to a clock signal;
   means for generating a read-out signal when both of said first detection signal and said first status signal are present or when both of said second detection signal and said second status signal are present;
   a preset memory for storing first and second preset data and for outputting to a bus line said first preset data in response to said read-out signal and said first status signal and said second preset data in response to said read-out signal and said second status signal;
   a count memory having first and second memory areas and coupling to said bus line said first memory area in response to said first status signal and said second memory area in response to said second status signal;
   means coupled to said bus line for subtracting a predetermined value from the data on said bus line and for returning the result of the subtraction to said bus line in response to each of said first and second status signals;
   means responsive to said first and second detection signals and said first and second status signals for generating a write signal before the generation of said read-out signal; and
   an error signal memory having third and fourth memory areas and storing the data on said bus line into said third memory area in response to said write signal and said first status signal and into said fourth memory area in response to said write signal and said second status signal, the data stored in said third and fourth memory areas being generated as said first and second error signals, respectively.

4. A generator as claimed in claim 3, wherein said first and second detection signals are derived as frequency detection signals of a cylinder motor and a capstan motor of a video tape recorder, respectively.

* * * * *

UNITED STATES PATENT AND TRADEMARK OFFICE
CERTIFICATE OF CORRECTION

PATENT NO. : 4,731,568

DATED : March 15, 1988

INVENTOR(S) : Shimada

It is certified that error appears in the above-identified patent and that said Letters Patent is hereby corrected as shown below:

COLUMN 5, LINE 66  After "GH(P2)" delete "GH(P1)" and insert --GH(F1)--;

COLUMN 6, LINE 3  Delete "resectively" and insert --respectively--;

COLUMN 6, LINE 39  Delete "a" and insert --an--.

Signed and Sealed this

Fifteenth Day of November, 1988

Attest:

DONALD J. QUIGG

Attesting Officer   Commissioner of Patents and Trademarks